(12) United States Patent
Lee

(10) Patent No.: US 9,937,591 B2
(45) Date of Patent: Apr. 10, 2018

(54) WELDING DEVICE AND METHOD OF WELDING AUTOMOBILE PARTS

(71) Applicant: Hyundai Motor Company, Seoul (KR)

(72) Inventor: Hyun Woo Lee, Ulsan (KR)

(73) Assignee: Hyundai Motor Company, Seoul (KR)

(*) Notice: Subject to any disclaimer, the term of this patent is extended or adjusted under 35 U.S.C. 154(b) by 297 days.

(21) Appl. No.: 14/807,955

(22) Filed: Jul. 24, 2015

(65) Prior Publication Data

US 2016/0158893 A1 Jun. 9, 2016

(30) Foreign Application Priority Data

Dec. 5, 2014 (KR) .................. 10-2014-0174070

(51) Int. Cl.
*B23K 37/04* (2006.01)
*B23K 37/02* (2006.01)
*B23K 101/00* (2006.01)

(52) U.S. Cl.
CPC ...... *B23K 37/0452* (2013.01); *B23K 37/0211* (2013.01); *B23K 37/04* (2013.01); *B23K 2201/006* (2013.01)

(58) Field of Classification Search
CPC .......... B23K 2201/006; B23K 37/0452; B23K 37/02; B23K 37/0211–37/0235; B23K 37/0241; B23K 37/0294; B23K 37/04–37/0417; B23K 37/0426–37/0443; B23K 37/0477

USPC .................. 219/136, 137 R; 228/47.1–49.6
See application file for complete search history.

(56) References Cited

U.S. PATENT DOCUMENTS

| | | | |
|---|---|---|---|
| 6,193,142 B1* | 2/2001 | Segawa ............... | B23K 37/047 219/127 |
| 6,525,294 B1 | 2/2003 | Kipping et al. | |
| 2011/0272384 A1* | 11/2011 | Matsushita .......... | B23K 11/115 219/91.2 |
| 2012/0270062 A1 | 10/2012 | Horibata et al. | |
| 2014/0339853 A1 | 11/2014 | Sato et al. | |

FOREIGN PATENT DOCUMENTS

| | | |
|---|---|---|
| JP | S60118391 A | 6/1985 |
| JP | 2011-147865 A | 8/2011 |
| JP | 2011-230129 A | 11/2011 |
| JP | 2013-121754 A | 6/2013 |
| KR | 10-2011-0085087 A | 7/2011 |
| KR | 10-2014-0107017 A | 9/2014 |

\* cited by examiner

*Primary Examiner* — Sang Y Paik
(74) *Attorney, Agent, or Firm* — Mintz Levin Cohn Ferris Glovsky and Popeo, P.C.; Peter F. Corless

(57) ABSTRACT

A welding device provided for welding automobile parts received in a pallet to a vehicle body includes: an aligner configured to grip and align the parts received in the pallet; a mover configured to move the aligner to take out the parts and let the taken out parts adhere to an installation position of the vehicle body; and a welding machine configured to weld the adhering portion between the parts and the vehicle body.

14 Claims, 6 Drawing Sheets

WELDING DEVICE AND METHOD OF WELDING AUTOMOBILE PARTS

CROSS-REFERENCE TO RELATED APPLICATION

This application claims under 35 U.S.C. § 119(a) the benefit of Korean Patent Application No. 10-2014-0174070, filed on Dec. 5, 2014 in the Korean Intellectual Property Office, the entire contents of which are incorporated herein by reference.

BACKGROUND (a) Technical Field

The present invention relates to a welding device and a method of welding automobile parts, and more particularly, to a welding device and method capable of gripping, aligning, and welding multiple parts at a time.

(b) Description of the Related Art

Generally, an automobile is manufactured by welding and assembling numerous panels. In particular, the automobile is manufactured by a primary process of welding a front part, a floor part, and a rear part, respectively, a secondary process of gathering these three parts into one place and welding them, and a tertiary process of welding or assembling required external panels to or with these three parts.

A welding system of automobile parts according to the related art includes a pallet in which parts such as panels are received, an articulated robot equipped with a gripper taking out parts received in the pallet, a jig configured to let the parts taken out by the gripper adhere to a vehicle body in the state in which the parts are aligned, and a welding device configured to weld the parts to the vehicle body.

SUMMARY

The welding system of automobile parts according to the related art has a problem in that since the articulated robot, the jig, and the welding device are each separated from one another, a number of processes is required to weld each part to the vehicle body, and therefore a lot of time is required, continuity of operations is reduced, and in particular, a large installation space needs to be secured.

An aspect of the present invention provides a welding device and a method of welding automobile parts capable of saving operation time, improving continuity of operations, and minimizing an installation space by performing the taking out, aligning, and welding of the parts with a single connection operation.

According to an exemplary embodiment of the present invention, a welding device for welding a plurality of parts (e.g., automobile parts) received in a pallet to a vehicle body includes: an aligner configured to grip and align the parts received in the pallet; a mover configured to move the aligner to take out the parts and let the taken out parts adhere to an installation position of the vehicle body; and a welding machine configured to weld the adhering portion between the parts and the vehicle body.

The aligner may include: an aligning main body configured to be coupled with an articulated robot; a gripping member configured to be provided at one side of the aligning main body and grip one end of the parts received in the pallet; and an aligning member configured to be provided at the other side of the aligning main body and fix and align the other end of the parts received in the pallet.

The gripping member may include: a support plate configured to be fixed to the aligning main body and support an upper surface of one end of the parts; a pressing piece configured to be rotatably coupled with a hinge part of the support plate and have one side provided with a pressing part which presses a lower surface of one end of the parts; and a cylinder configured to be connected with the other side of the pressing piece and rotate the pressing piece to allow the pressing part to press the lower surface of one end of the parts.

The pressing piece and the cylinder may be provided on the support plate and the support plate may be mounted on the aligning main body and have a height controlled to be mounted toward the gripped parts or in an opposite direction thereto.

The aligning member may include: a rotating part configured to have both ends each rotatably coupled with the other side of the aligning main body; and at least one index pin configured to be mounted on the rotating part and fix and press the other end of the parts received in the pallet to align the parts.

The rotating part may be configured of two rotating bars longitudinally connected to each other, wherein the two rotating bars have different diameters and are each provided with the index pin.

An outer circumferential surface of the rotating part may be provided with the plurality of index pins having different sizes and shapes and the index pins fitting the parts according to a kind of gripped parts may be positioned while the rotating part rotates.

The rotating part may rotate by a motor.

The rotating part may have a square pillar shape and have each surface provided with the index pin having different sizes and shapes, respectively, and the motor may rotate the rotating part by 60 to 120° to position the index pin fitting the kind of parts.

The mover may be an articulated robot arm.

The welding machine may include: a welding member configured to press the parts to form a protrusion adhering to the vehicle body; and a current member configured to include a positive (+) current unit supplying a positive (+) current to the parts and a negative (−) current unit supplying a negative (−) current to the vehicle body, wherein the positive (+) current supplied to the parts and the negative (−) current supplied to the vehicle body may be concentrated on the protrusion which is the adhering portion between the parts and the vehicle body to generate heat (e.g., high heat) so as to weld the protrusion to the vehicle body.

A pressing force of the welding member may be 50 to 70 kgf.

The welding member may form the protrusion having a size of 0.5 to 2.0 mm in height and 2.0 to 8.0 mm in width on the surface of the parts.

The welding machine may include a fixing member which presses the end of the parts to be arbitrarily fixed to the vehicle body.

According to another exemplary embodiment of the present invention, a method of welding a plurality of parts received in a pallet to a vehicle body includes the steps of: gripping and aligning the parts received in the pallet; moving the aligned parts to take out the aligned parts from the pallet and let the aligned parts adhere to the installation position of the vehicle body; and welding the protrusion to the vehicle body by forming the protrusion adhering to the vehicle body by pressing a surface of the parts, supplying a positive current to the parts and a negative current to the vehicle body and concentrating the positive current supplied to the parts and the negative current supplied to the vehicle body on the protrusion which is an adhering portion between the part and the vehicle body to generate high heat.

In the gripping and aligning step, the parts may be gripped and aligned by an aligner.

In the welding step, the parts may be welded to the vehicle body by a welding machine

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
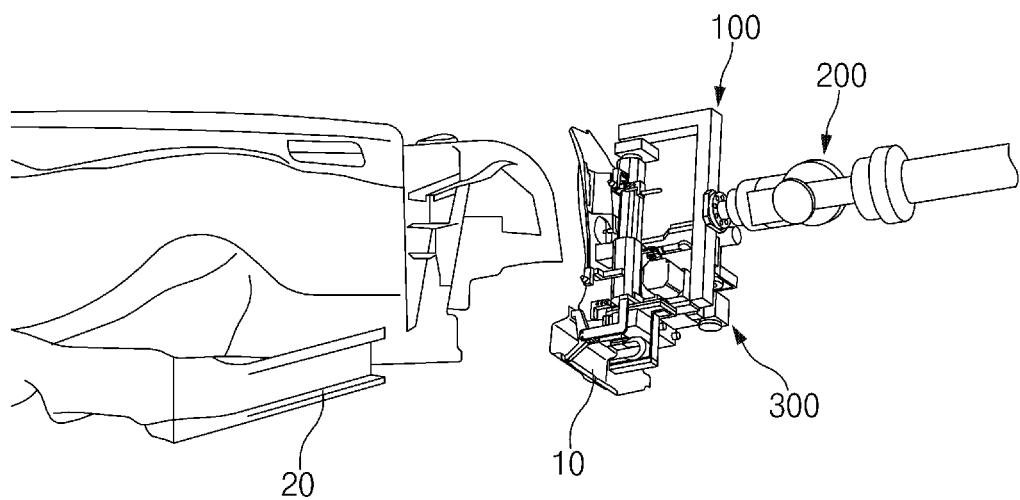
FIG. 1 is a perspective view illustrating a welding device of automobile parts according to an exemplary embodiment of the present invention.

Hereinafter, exemplary embodiments of the present invention will be described in detail with reference to the accompanying drawings so that they can be easily practiced by those skilled in the art to which the present invention pertains. However, the present invention may be modified in various different ways and is not limited to the embodiments provided in the present description. In the accompanying drawings, portions unrelated to the description will be omitted in order to obviously describe the present invention, and similar reference numerals will be used to describe similar portions throughout the present specification.

It is understood that the term "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A welding device of automobile parts according to an exemplary embodiment of the present invention preferably includes an aligner configured to grip and align parts, a mover configured to let the parts adhere to a vehicle body, and a welding machine configured to weld the parts to the vehicle body. In particular, it is possible to increase efficiency of operations by performing the gripping, aligning, taking out, and welding of the parts with a single continuous operation, so as save costs and increase the convenience of installation by simplifying the welding device.

Hereinafter, the welding device of automobile parts according to the exemplary embodiment of the present invention will be described with reference to the accompanying drawings.

Meanwhile, an assembly line of an automobile includes a primary process of manufacturing a front part, a floor part, and a rear part, respectively, a secondary process of welding the three parts to manufacture a vehicle body, and a tertiary process of welding and assembling external panels to and with the vehicle body.

Herein, the present invention will describe the welding device of automobile parts for welding a front filler inner (hereinafter, referred to as a plurality of parts) to the vehicle body during the tertiary process as one exemplary embodiment.

Welding Device of Automobile Parts

Figure 2:
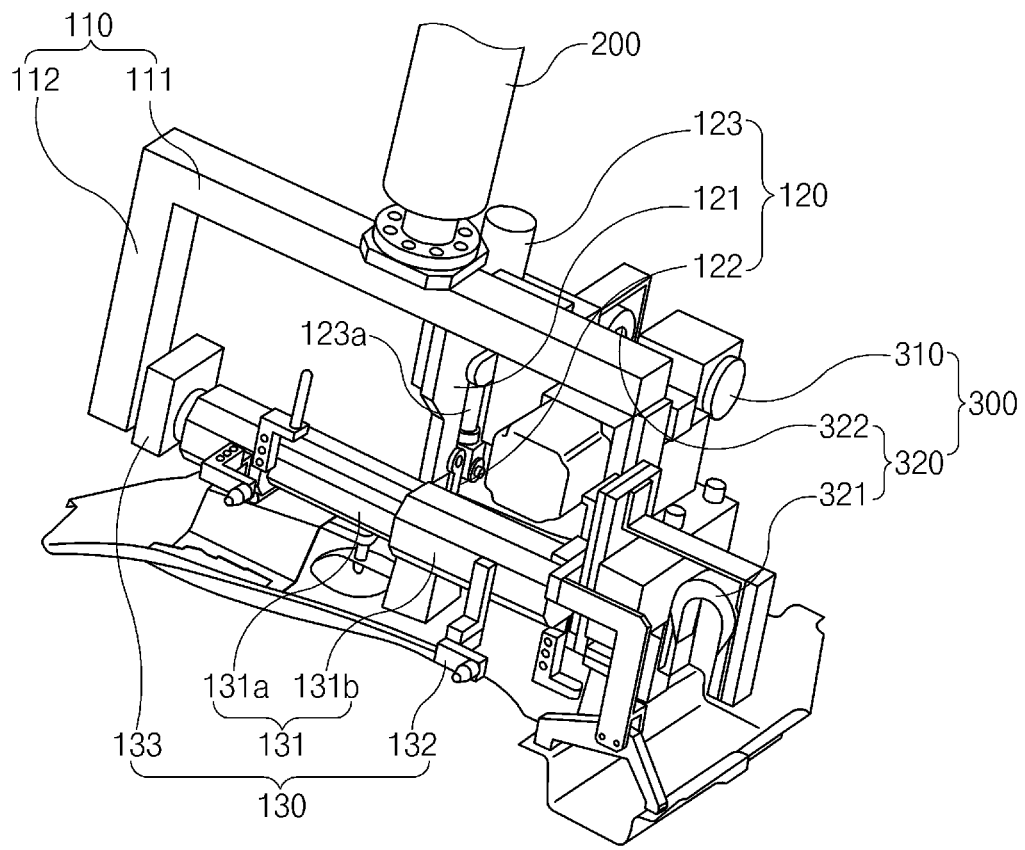
FIG. 2 is an enlarged perspective view illustrating the welding device of automobile parts according to the exemplary embodiment of the present invention.

As illustrated in FIGS. 1 and 2, the welding device of automobile parts according to the exemplary embodiment of the present invention is arranged to weld a plurality of parts 10 received in a pallet (not shown) to a vehicle body 20 and includes an aligner 100 configured to grip and align the parts 10 received in the pallet, a mover 200 configured to move the aligner 100 to take out the parts 10 and let the taken out parts adhere to an installation position of the vehicle body 20, and a welding machine 300 configured to weld the adhering portion between the parts 10 and the vehicle body 20. In this configuration, the aligner 100, the mover 200, and the welding machine 300 are connected to one another to be configured as an integrated device, and therefore the structure may be simplified and operations may be continuously performed.

Referring to FIG. 2, the aligner 100 according to the exemplary embodiment of the present invention is arranged to grip and align the parts received in the pallet and includes an aligning main body 110, a gripping member 120 configured to grip and fix one end of the parts 10 received in the pallet, and an aligning member 130 configured to fix and align the other end of the parts received in the pallet The aligning main body 110 includes a horizontal bar 111 configured to be coupled with the mover 200 and vertical bars 112 configured to be each provided at both ends of the horizontal bar 111 and be coupled with the aligning member 130. In particular, in the aligning main body 110, the horizontal bar 111 and the vertical bar 112 have approximately a "ㄷ"-letter shape.

Figure 4:
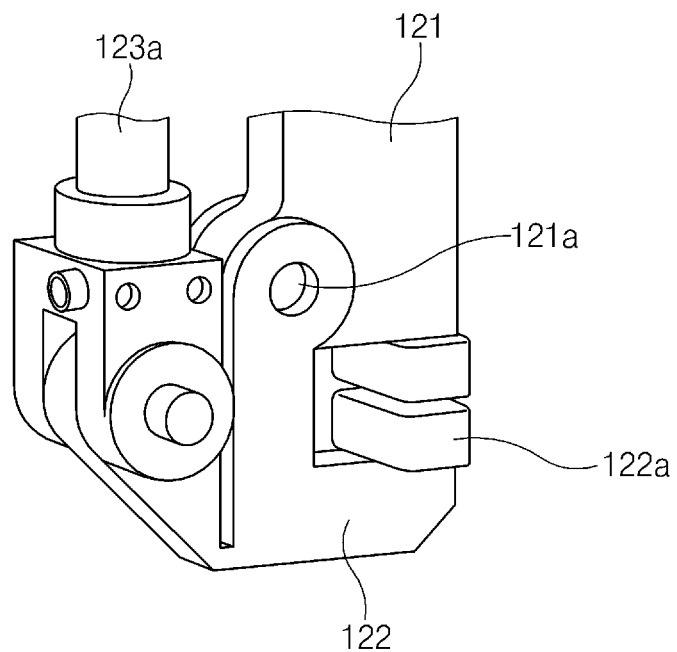
FIG. 4 is a diagram illustrating a gripping member according to an exemplary embodiment of the present invention.

As illustrated in FIG. 4, the gripping member 120 is arranged to press and grip one end of the parts and includes a support plate 121 configured to be fixed to one side of the aligning main body 110 and support an upper surface of one end (right end of the parts when viewed from FIG. 1), a pressing piece 122 configured to be rotatably coupled with a hinge part 121*a* of the support plate 121 and have one side provided with a pressing part 122*a* which presses a lower surface of one end of the parts 10, and a cylinder 123 configured to be connected with the other side of the pressing piece 122 and rotate the pressing piece 122 to allow the pressing part 122*a* to press the lower surface of one end of the parts 10.

In particular, the gripping member 120 descends the other side of the pressing piece 122 while a piston rod 123*a* of the cylinder 123 is stretched, and at the same time, the pressing part 122*a* of the pressing piece 122 presses the lower surface of one end of the parts 10 while ascending based on the hinge part 121*a*.

The gripping member 120 having the above configuration grips one end of the parts 10 by a pressing force of the support plate 121 configured to support the upper surface of one end of the parts 10 and a pressing force of the pressing piece 122 configured to form the pressing part 122*a* pressing the lower surface of one end of the parts 10 while rotating by the cylinder 123.

Meanwhile, the gripping member 120 may have a height controlled to be mounted on the aligning main body 110. In particular, the pressing piece 122 and the cylinder 123 in the gripping member 120 are provided on the support plate 121, and the support plate 121 is mounted on the aligning main body 110 and may have the height controlled to be mounted toward the parts 10 gripped by a fixing bolt (not illustrated) or in an opposite direction thereto. Therefore, the gripping member 120 may have the height controlled to fit a height or a shape of the parts 10, and therefore interoperability and a stabilized fixing force may be increased.

Figure 3:
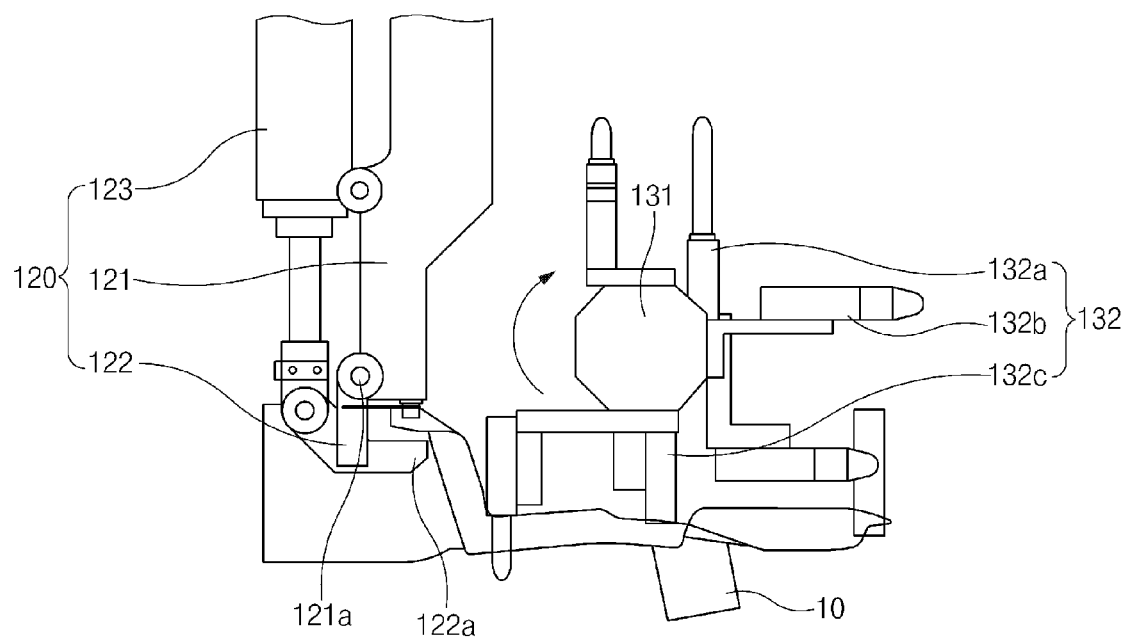
FIG. 3 is a diagram illustrating an aligner according to the exemplary embodiment of the present invention.

As illustrated in FIG. 3, the aligning member 130 is arranged to fix and align the other end of the parts gripped by the gripping member at a predetermined height and includes a rotating part 131 configured to have both ends each rotatably coupled with the other side of the aligning main body 110, that is, the vertical bar 112, and at least one index pin 132 configured to be mounted on the rotating part 131 and align the parts 10 while being inserted and supported into the other end of the parts 10 received in the pallet.

The rotating part 131 is configured of two rotating bars 131*a* and 131*b* which are longitudinally connected to each other, in which the two rotating bars 131*a* and 131*b* have different diameters and are each provided with the index pin 132.

In particular, in order to stably support and align the automobile panel having many curved lines, at least two index pins 132 are used, and the at least two index pins 132 need to have different heights and positions. Therefore, the rotating part 131 couples the index pins 132 with the two rotating bars 131*a* and 131*b* having different diameters, respectively, to make the height and position of the index pins 132 different, thereby more stably fixing the other end of the parts 10 and pressing the parts 10 to be aligned at a set height.

Referring to FIG. 3, the index pin 132 is arranged to align the parts at a predetermined height while being inserted into a hole formed at the other end of the parts or fitted in the end thereof, and includes a fixing part configured to be fixed to the rotating part 131 and a pressing part configured to be provided at a tip of the fixing part 132*a* and press the parts 10 to be aligned at a predetermined height while being inserted into the hole formed at the other end of the parts 10 or fitted in the end thereof.

Meanwhile, an outer circumferential surface of the rotating part 131 is provided with the plurality of index pins 132 having different sizes and shapes. In particular, retelling to FIG. 3, a plurality of index pins 132*a*, 132*b*, and 132*c* having different sizes and shapes are mounted on the sides, upper surface, and lower surface of the rotating part 131, respectively, and are positioned toward the parts 10 as the rotating part 131 rotates by 90°.

Meanwhile, the rotating part 131 is rotated by approximately 60 to 120° by a motor 133, preferably approximately 90°, and the motor 133 is connected to the end of one side of the rotating part 131 so as to transfer power thereto.

Meanwhile, the rotating part 131 has a square pillar shape and can easily and firmly fix the index pin 132 having different sizes and shapes to each surface of the rotating part 131.

The aligner 100 having the above configuration may grip one end of the parts 10 by the gripping member 120 and fix and align the other end of the parts 10 by the aligning member 130 at a predetermined height.

The mover 200 according to the exemplary embodiment of the present invention moves the aligner to take out the parts and let the taken out parts adhere to the installation position of the vehicle body, where an articulated robot arm can be used as the mover 200.

Figure 5:
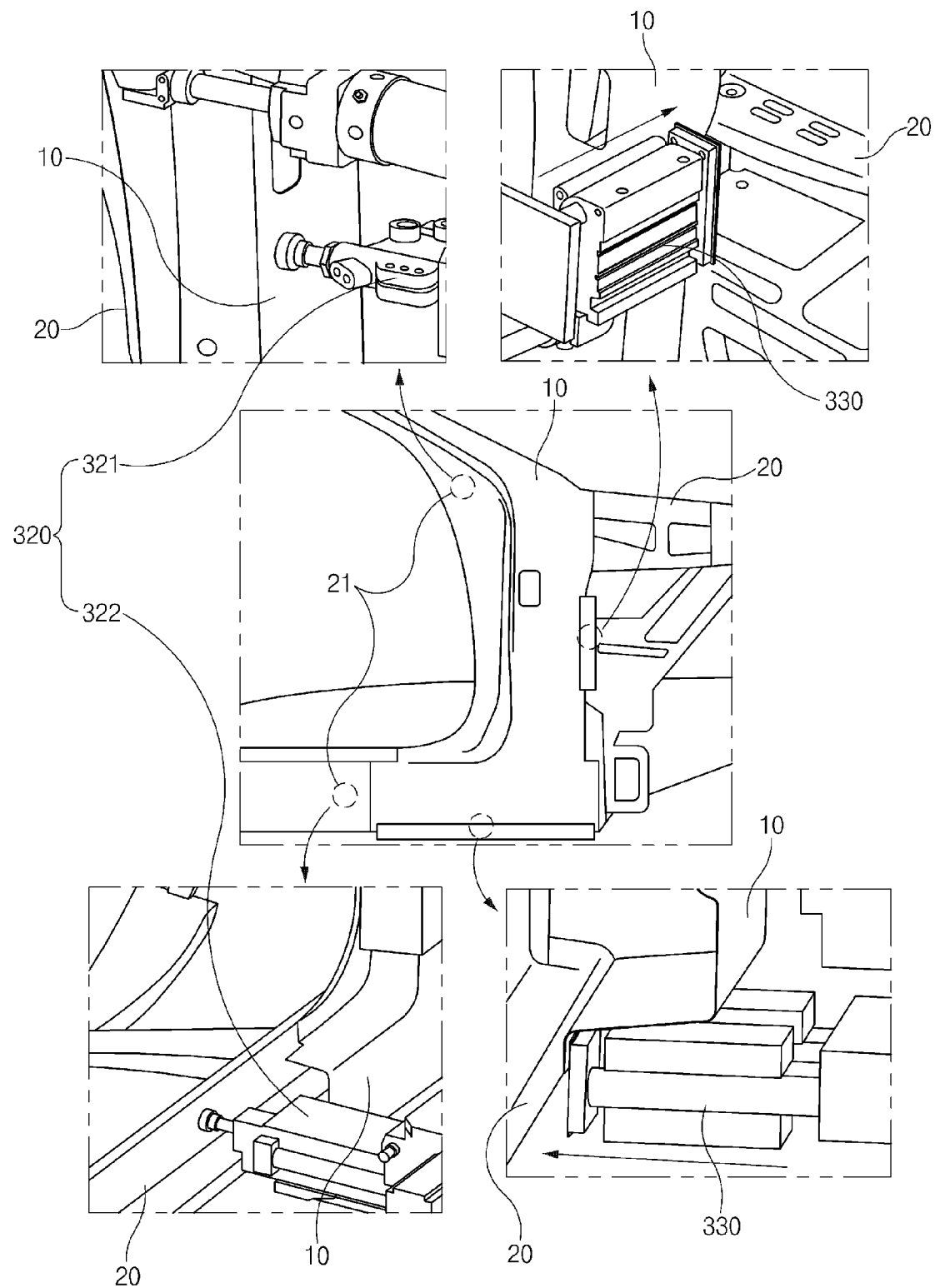
FIG. 5 is a diagram illustrating a welding machine according to an exemplary embodiment of the present invention.

As illustrated in FIGS. 1 and 5, the welding machine 300 according to the exemplary embodiment of the present invention welds the parts to the vehicle body and includes a welding member 310 configured to press the parts 10 to form a protrusion 11 adhering to the vehicle body 20 and a current member 320 configured to include a positive (+) current unit 321 supplying a positive (+) current to the parts 10 and a negative (−) current unit 322 supplying a negative (−) current to the vehicle body 20.

The welding member 310 hits a surface of the parts 10 to form the protrusion 11 adhering to the vehicle body 20. Here, the welding member 310 lets the protrusion 11 adhere to the vehicle body 20 using a pressing force of 50 to 70 kgf. In particular, when the pressing force of the welding member 310 is lower than 50 kgf, the protrusion 11 may be separated from the vehicle body 20 and when the pressing force of the welding member 310 is higher than 70 kgf, the vehicle body 20 may be deformed.

Further, the protrusion 11 is formed on the surface of the parts 10 at a size of 0.5 to 2.0 mm in height and 2.0 to 8.0 mm in width, preferably, a size of 1.0 mm in height and 5.0 mm in width, and thus the protrusion 11 may adhere to the vehicle body 20 due to the height of the protrusion 11 even though a micro gap is generated between the parts 10 and the vehicle body 20 and the welded area may be increased due to the width to increase an adhesion.

When the protrusion 11 adheres to the vehicle body 20 by the welding member 310, a tip of the protrusion 11 adheres to the vehicle body 20 and the parts 10, respectively, and thus the positive (+) current unit 321 and the negative (−) current unit 322 each supply a positive (+) current and a negative (−) current.

The welding machine 300 having the above configuration generates heat (e.g., high heat) while the positive (+) current supplied to the parts 10 and the negative (−) current supplied to the vehicle body 20 are concentrated on the protrusion 11 which is the adhering portion between the parts 10 and the vehicle body 20, and the protrusion 11 is melted by the high heat to be welded to the vehicle body 20.

Meanwhile, the welding machine 300 further includes a fixing member 330 which fixes the parts to prevent the parts from moving when the parts are welded to the vehicle body. The fixing member 330 includes a cowl fixing part configured to press a cowl part side and a side seal fixing part pressing a side seal part side, in an adhering surface between the parts and the vehicle body.

Therefore, the welding device of automobile parts according to the exemplary embodiment of the present invention may perform the gripping, aligning, and taking out of the parts and the adhering and welding of the parts to the vehicle body by the single continuous operation to increase the efficiency of operations, in particular, simplify the structure to increase the convenience of manufacturing and installation.

Method of Welding Automobile Parts

Hereinafter, a method of welding automobile parts using the welding device according to the exemplary embodiment of the present invention will be described with reference to the accompanying drawings.

Figure 6:
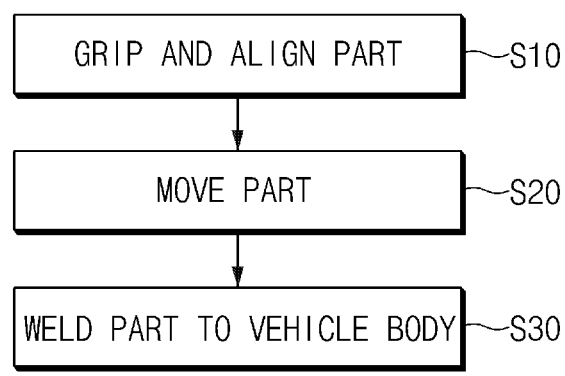
FIG. 6 is a flow chart illustrating a welding method of automobile parts according to an exemplary embodiment of the present invention.

As illustrated in FIG. 6, the welding method according to the exemplary embodiment of the present invention includes gripping and aligning the parts received in the pallet (S10), moving the aligned parts to take out the aligned parts from the pallet and let the aligned parts adhere to the installation position of the vehicle body (S20), and welding the parts to the vehicle body (S30).

Referring to FIG. 1, in the gripping and aligning step (S10), the parts received in the pallet are gripped and aligned by the aligner 100. In particular, the gripping member 120 which includes the support plate 121 configured to support the upper surface of one end of the parts 10 and the pressing piece 122 configured to form the pressing part 122a pressing the lower surface of one end of the parts 10 while rotating by the cylinder 123, grips and fixes one end of the part.

Next, the aligning member 130 supports the other end of the parts 10 to be aligned at a predetermined height. In particular, the index pin 132 fitting the kind of parts 10 is positioned by rotating the rotating part 131 and the other end of the parts 10 is supported or pressed by the index pin 132 to be aligned at a predetermined height.

In the moving step (S20), to let the gripped and aligned parts 10 adhere to the installation position of the vehicle body, the aligner 100 is moved by the mover 200, which can be an articulated robot arm, to let the parts 10 rotate toward the installation position of the vehicle body 20 while taking out the parts 10 from the pallet and then adhering them to the vehicle body.

In the welding step (S30), the welding machine 300 is used to weld the parts to the vehicle body. In particular, the welding member 310 presses the surface of the parts to form the protrusion 11 adhering to the vehicle body and the positive (+) current unit 321 adheres to the parts 10 to supply the positive (+) current and the negative (−) current unit 322 adheres to the vehicle body 20 to supply the negative (−) current. Next, the high heat is generated while the positive (+) current supplied to the parts 10 and the negative (−) current supplied to the vehicle body 20 are concentrated on the protrusion 11 which is the adhering portion between the parts 10 and the vehicle body 20 and the protrusion 11 or the vehicle body 20 is melted by the high heat to weld the protrusion 11 to the vehicle body 20.

According to the present invention, it is possible to obtain at least the following effects. First, it is possible to increase the efficiency of operations by performing the gripping, aligning, taking out, and welding of parts with the single continuous operation, in particular, facilitate the manufacturing and the installation by simplifying the structure. Second, it is possible to simultaneously perform the gripping and aligning of parts and increase the efficiency of operations, by including the gripping member gripping one end of parts and the aligning member fixing and aligning the other end of parts. Third, it is possible to selectively use the index pins having various standards to be applied to parts of various car models. Fourth, it is possible to increase the convenience of the welding operation by forming protrusions on parts to adhere to the vehicle body and concentrating a current on the protrusion to weld the parts to the vehicle body.

It should be understood that the scope of the present invention is defined by the following claims rather than the above-mentioned detailed description and all modifications or alterations deduced from the meaning, the scope, and equivalences of the claims are included in the scope of the present invention.

What is claimed is:

1. A welding device for welding a plurality of parts received in a pallet to a vehicle body, the welding device comprising:
   an aligner configured to grip and align the parts received in the pallet;
   a mover configured to move the aligner to take out the parts and let the taken out parts adhere to an installation position of the vehicle body; and
   a welding machine configured to weld an adhering portion between the parts and the vehicle body
   wherein the aligner includes:
   an aligning main body configured to be coupled with an articulated robot;
   a gripping member configured to be provided at one side of the aligning main body and grip one end of the parts received in the pallet;
   an aligning member configured to be provided at the other side of the aligning main body and fix and align the other end of the parts received in the pallet; and
   wherein the aligning member includes:
   a rotating part configured to have both ends each rotatably coupled with the other side of the aligning main body; and
   at least one index pin configured to be mounted on the rotating part and fix and press the other end of the parts received in the pallet to align the parts.

2. The welding device according to claim 1, wherein the gripping member includes:
   a support plate configured to be fixed to the aligning main body and support an upper surface of one end of the parts;
   a pressing piece configured to be rotatably coupled with a hinge part of the support plate and have one side provided with a pressing part which presses a lower surface of one end of the parts; and a cylinder configured to be connected with the other side of the pressing piece and rotate the pressing piece to allow the pressing part to press the lower surface of one end of the parts.

3. The welding device according to claim 2, wherein the pressing piece and the cylinder are provided on the support plate, and the support plate is mounted on the aligning main body and has a height controlled to be mounted toward the gripped parts or in an opposite direction thereto.

4. The welding device according to claim 1, wherein the rotating part is configured of two rotating bars longitudinally connected to each other, the two rotating bars having different diameters and each being provided with the index pin.

5. The welding device according to claim 1, wherein an outer circumferential surface of the rotating part is provided with a plurality of the index pins having different sizes and shapes, and the index pins fitting the parts according to a kind of gripped parts are positioned while the rotating part rotates.

6. The welding device according to claim 1, wherein the rotating part is configured to be rotated by a motor.

7. The welding device according to claim 6, wherein the rotating part has a square pillar shape and has each surface provided with the index pin having different sizes and shapes, respectively, and the motor rotates the rotating part by 60 to 120° to position the index pin fitting the kind of parts.

8. The welding device according to claim 1, wherein the mover is an articulated robot arm.

9. The welding device according to claim 1, wherein the welding machine includes:

a welding member configured to press the parts to form a protrusion adhering to the vehicle body; and a current member configured to include a positive current unit supplying a positive current to the parts and a negative current unit supplying a negative current to the vehicle body, and the positive current supplied to the parts and the negative current supplied to the vehicle body are concentrated on the protrusion which is the adhering portion between the parts and the vehicle body to generate heat so as to weld the protrusion to the vehicle body.

10. The welding device according to claim 9, wherein a pressing force of the welding member is 50 to 70 kgf.

11. The welding device according to claim 9, wherein the welding member forms the protrusion having a size of 0.5 to 2.0 mm in height and 2.0 to 8.0 mm in width on a surface of the parts.

12. The welding device according to claim 9, wherein the welding machine includes a fixing member which presses the end of the parts to be arbitrarily fixed to the vehicle body.

13. A method of welding a plurality of parts received in a pallet to a vehicle body, the welding method comprising the steps of:

gripping and aligning the parts received in the pallet and fix and press the other end of the parts received in the pallet to align the parts by an index pin of an aligner;

moving the aligned parts to take out the aligned parts from the pallet and let the aligned parts adhere to an installation position of the vehicle body; and welding a protrusion to the vehicle body by forming the protrusion adhering to the vehicle body by pressing a surface of the parts, supplying a positive current to the parts and a negative current to the vehicle body and concentrating the positive current supplied to the parts and the negative current supplied to the vehicle body on the protrusion which is an adhering portion between the part and the vehicle body to generate heat.

14. The welding method according to claim 13, wherein in the welding step, the parts are welded to the vehicle body by a welding machine.

* * * * *